United States Patent [19]
Perstnev et al.

[11] Patent Number: 5,934,338
[45] Date of Patent: Aug. 10, 1999

[54] HEAT INSULATING COVERING AND METHOD

[75] Inventors: Alexander Perstnev; Samuel Perstnev, both of Kiryat Malachi, Israel

[73] Assignee: Isoltherm A.P. Ltd., Ashkelon, Israel

[21] Appl. No.: 08/855,124

[22] Filed: May 13, 1997

[30] Foreign Application Priority Data

Feb. 5, 1997 [IL] Israel ........................................ 120155

[51] Int. Cl.$^6$ ...................................................... F16L 9/14
[52] U.S. Cl. ..................... 138/149; 138/148; 138/DIG. 2
[58] Field of Search ................................. 138/149, 148, 138/146, DIG. 2

[56] References Cited

U.S. PATENT DOCUMENTS

| | | | |
|---|---|---|---|
| 1,251,393 | 12/1917 | Longley | 138/150 |
| 3,665,968 | 5/1972 | De Putter | 138/DIG. 2 |
| 3,929,167 | 12/1975 | Bickel | 138/151 |
| 3,955,601 | 5/1976 | Plummer, III | 138/149 |
| 4,025,675 | 5/1977 | Jonda | 138/148 |
| 4,968,545 | 11/1990 | Fellman et al. | 138/149 |
| 5,310,594 | 5/1994 | Holland et al. | 138/151 |

*Primary Examiner*—Denise L. Ferensic
*Assistant Examiner*—James F. Hook
*Attorney, Agent, or Firm*—Ostrolenk, Faber, Gerg & Soffen, LLP

[57] ABSTRACT

A method of insulating a heated surface comprising enveloping the surface by a first layer of a heat insulating material having a high thermal resistivity such as Mineral Wool, and enveloping the first layer by a second layer of a material having a lower thermal resistivity, such as Polyurethane.

7 Claims, 3 Drawing Sheets

HEAT INSULATING COVERING AND METHOD

BACKGROUND OF THE INVENTION

The present invention relates to thermal insulation products, and more particularly to fluid conduits or containers thermal insulation envelops.

These products, usually in the form of sleeves or slabs, are customarily made of foamed polymeric material, mostly polyurethane (hereinafter for short "PU"), rubber and other polymers, both in elastic and in rigid forms. These materials are widely used due to their increased impact resistance and water protection capacity..

On the other hand, these materials are inferior in other respects: low temperature resistivity and lost of elasticity under relatively low temperature (about 90° C).

Mineral and glass wool (hereinafter for short "MW") have long been used as thermal insulators. While these materials have excellent insulating characteristics and high thermal resistivity, they posses low mechanical strength and low impact resistance, and are pervious to water. After prolonged use, articles made of MW may loose their shape and, moreover microscopic fibers are released, carried in the ambient air and may cause damage to the human health when penetrating the breathing system or eyes.

It is therefore the general object of the present invention to overcome the above detailed deficiencies, by providing a hybrid insulation structure that will combine the higher heat resistance of inorganic insulators such as MW, with the increased impact resistance and water protection of the polymer based materials.

It is a further object of the invention to form insulator envelops of an inner MW layer and an outer protective PU layer.

It is a still further object of the invention to achieve the optimal ratio of the inorganic and polymeric layers thicknesses.

SUMMARY OF THE INVENTION

According to the invention there is thus provided a method of insulating of a heated surface comprising the steps of enveloping the surface by a first layer of a heat insulating material having a high thermal resistivity, and enveloping the first layer by a second layer of a material having a lower thermal resistivity The first layer is preferably of inorganic minerals or glass wool and the second layer is of foamed material.

BRIEF DESCRIPTION OF THE DRAWINGS

These and additional features and advantages of the invention will become readily understood in the light of the following description of preferred embodiments thereof, given by way of example only, with reference to the accompanying drawings, wherein.

DETAILED DESCRIPTION OF THE PREFERRED EMBODIMENTS

Figure 1:
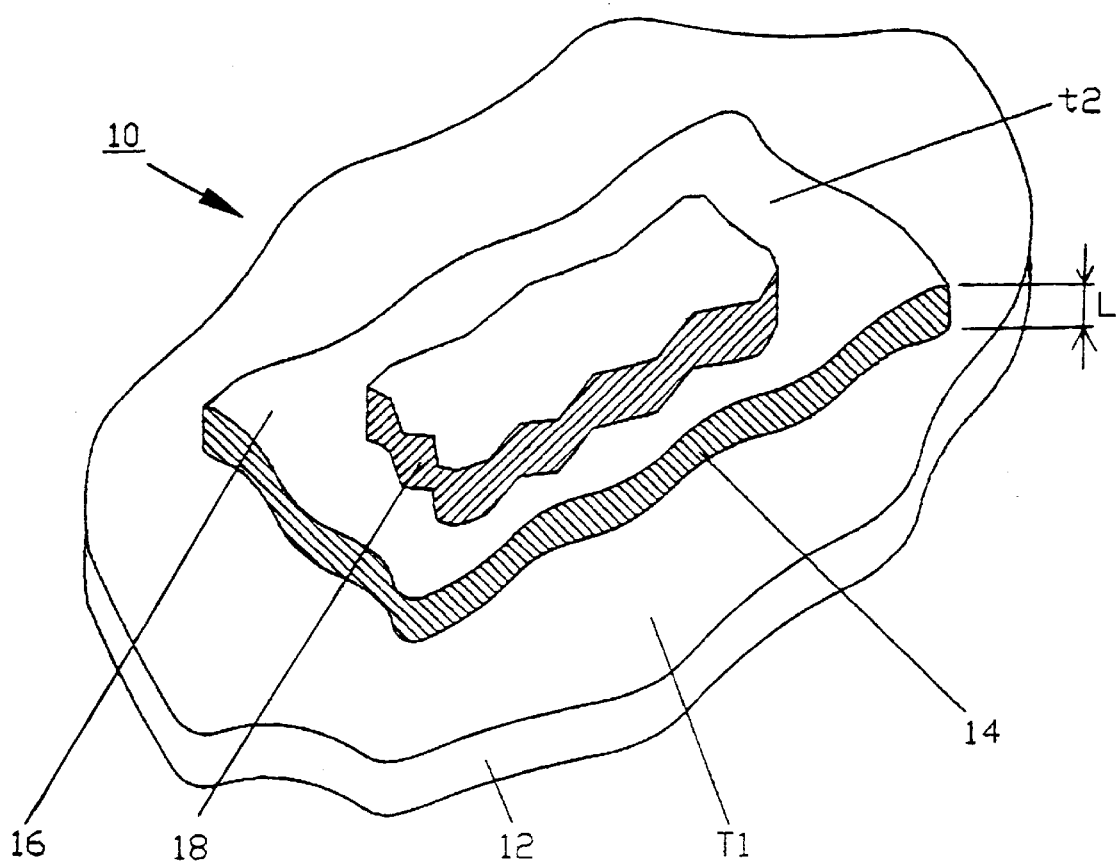
FIG. 1 shows a two-layer insulation slab.

FIG. 1 illustrates the application of the double-layer concept of the present invention to the common, slab-shaped insulator. Thus, a double-layer board or slab 10 is shown for heat insulating a surface 12. The interior layer 14 of width L is made of insulation material with high thermal resistance such as MW, Exterior layer 18 made of a polymeric foamed insulation material such as PU. The layers 14 and 18 may be glued to each other by a suitable adhesive layer 16.

The surface 12 is heated to a temperature $T_1$. In view of the considerations discussed above, in the one hand the interior insulated layer 14 should be of a thickness such as to insure that the temperature at its exposed side will be lower than the temperature $t_2$ that might affect the thermal resistance of the polymeric foamed insulation material of the exterior layer 18. On the other hand, the interior insulated layer 14 should not be excessively thick in order to save costs, and to facilitate the handling and assembly of board 10 as a whole.

Applicants found that the optimal width L (in mm) of the layer 14 should be according to the following equation:

$$L = 1/b \ln (T_1/t_2) \quad (1)$$

wherein, $T_1$ is the temperature of the surface 12;

$t_2$ is the thermal resistivity of the exterior layer 18 made of organic foamed material;

b is an empirical factor, which ranges between 0.019 and 0.025; and ln means the natural (Napierian) logarithm.

Figure 2:
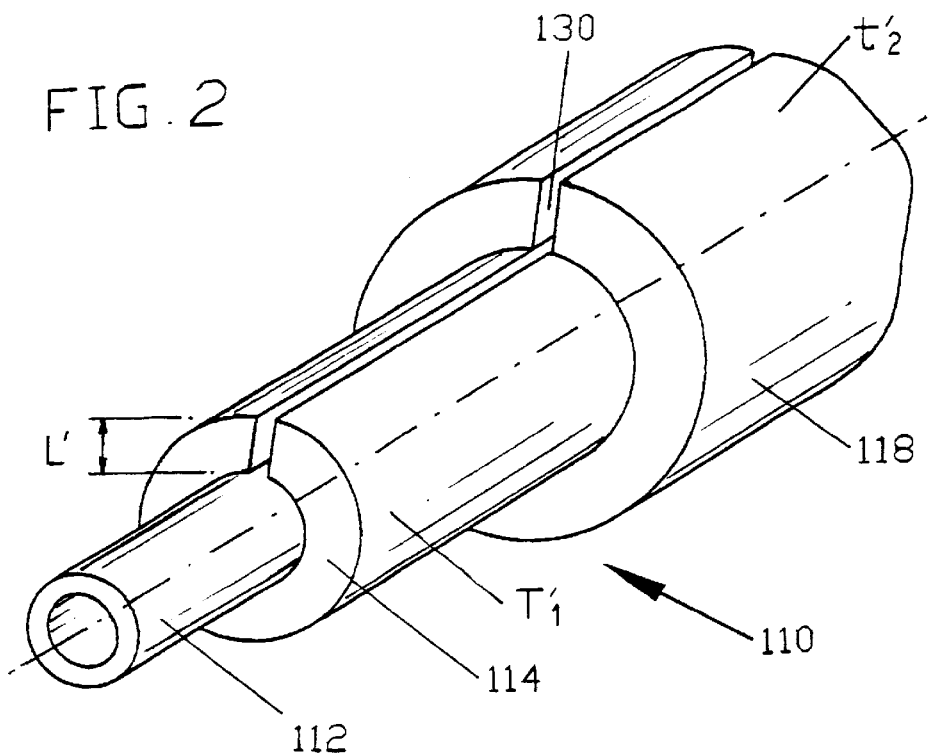
FIG. 2 shows a two-layer insulation piping jacket.

In FIG. 2 a yet another typical insulation product is illustrated, namely a piping sleeve 110. As in the previous embodiment, the product is composed of an interior layer 114 and an exterior layer 118 glued together by means of an adhesive material 116 such as an acrylic binder. For mounting the sleeve 110 onto a pipe 112, an elongated cut 130 is made, as conventionally known.

For calculation of the width L' (in mm) of the layer 114, the following formula should be used:

$$L'/r = (T'_1/t'_2)^{1/f} - 1 \quad (2)$$

wherein, $T'_1$ is the surface temperature of the pipe 112 (in ° C.);

$t'_2$ is the thermal resistivity of exterior layer 118 made of organic foamed material;

r is radius of the pipe 112 (in mm); and $f = 0{,}1 \, b \, (T'_1 + 0{,}002 \, rT'_1 + 10 \, r)$, wherein, b is an empirical factor which ranges between 0.019 and 0.025;

As known in the art, thicknesses of (conventional) sleeve shaped insulator products are selected by designers using manufacturers' standard specification tables as a function of the temperature of the surface to be insulated.

For example, the recommended thickness of MW sleeve, for 1" pipe and a temperature of 150° C. is 40 mm.

Obviously, the polymeric foamed materials such as VIDOFLEX, ARMOFLEX, etc., are inapplicable since their thermal resistance is too low (about 90° C.).

Thus, in accordance with formula (2) above, the thickness of the interior layer will be calculated as follows:

For $T'_1 = 150°$ C.; r=12.7 mm (1" pipe); and $t'_2 = 90°$ C. (the designed temperature of the outer surface of layer 118)—the thickness of the interior layer L' must be:

$L'/12.7=(150°\,C./90°\,C.)^{1/f}-1$, where $f=0.1\cdot b\cdot(150+0.002\cdot 12.7\cdot 150+10\cdot 12.7)=0.1\cdot b\cdot 280.81==28.081\cdot b;$ For b=0.019 the thickness is:

$L'=(1.671^{1/f}-1)\cdot 12.7=(1.67^{1.87}-1)\cdot 12.7=20.4;$

And for b=0.025:

$L'=(1.67^{1/f}-1)\cdot 12.7=(1.67^{1.42}-1)\cdot 12.7=13.59;$

Thus, the optimal thickness of the interior layer should be between 13.59 and 20.4 mm—rather than 40 mm.

Applying these calculations to similar cases, the following table can be complied:

| T1, (° C.) | T2, (° C.) | r (mm) | L' (mm) |
|---|---|---|---|
| 150 | 90 | 25.4 | 16.3–23.4 |
| 150 | 90 | 50.8 | 18.01–24.94 |
| 250 | 90 | 12.7 | 24.18–38.94 |
| 250 | 150 | 12.7 | 8.94–12.91 |
| 400 | 150 | 12.7 | 13.66–20.50 |
| 400 | 150 | 50.8 | 26.02–36.74 |
| 400 | 150 | 76.2 | 28.82–40.02 |
| 450 | 150 | 25.4 | 21.09–30.87 |

Figure 3:
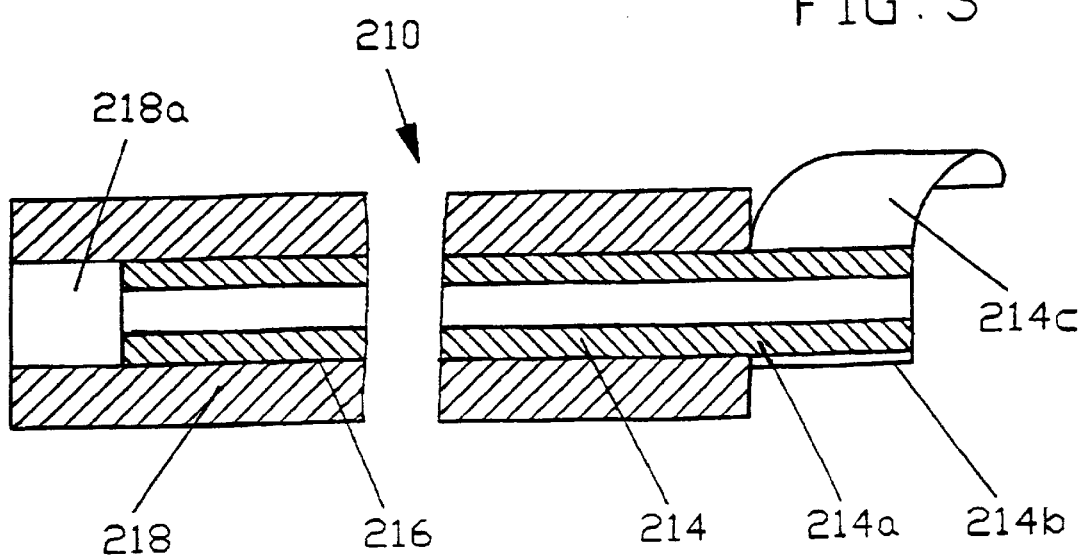
FIG. 3 is a longitudinal cross-section of an insulation pipe jacket connector.

The new conceptual approach of the double-layer insulation articles lends itself to various modifications and developments. Hence, as shown in FIG. 3, piping sleeve 210 may include an extension 214a of the interior layer 214 at one end, and a depression 218a at its other end. This will facilitate the assembly of the piping sleeves 210 in series to any desired length.

The extension 214a may be coated with an adhesive layer 214b, covered by a protective film 214c, such as wax-paper, which can be peeled off before use, as illustrated.

Figure 4:
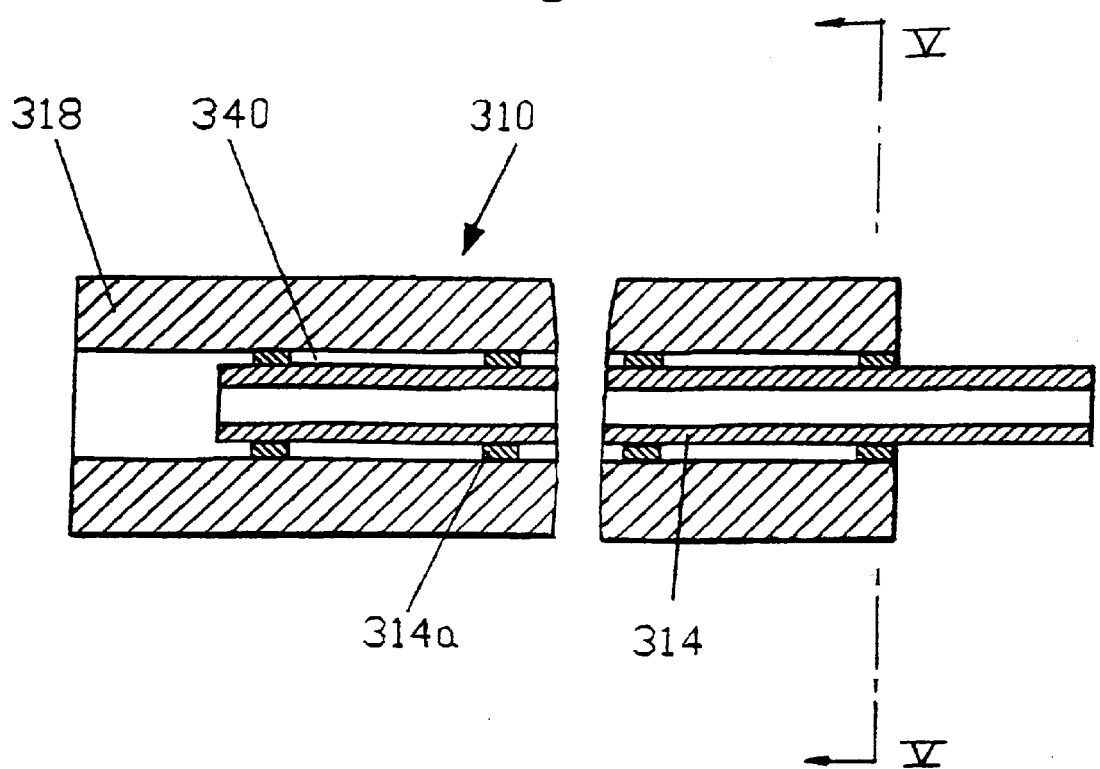
FIG. 4 is a modification of the connector of FIG. 3.
Figure 5:
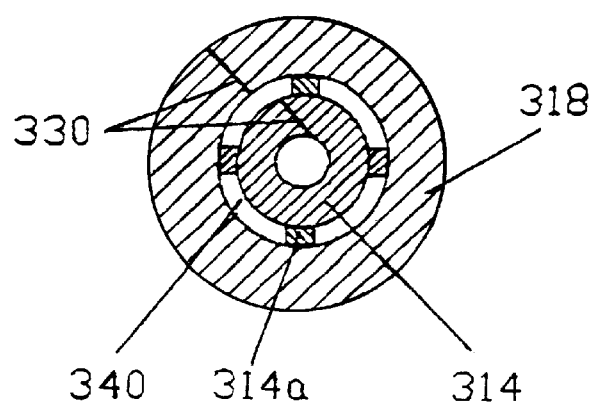
FIG. 5 is a sectional view taken along line V—V of FIG. 4.

Further, as shown in FIG. 4, the piping sleeve 310 has an interior layer 314 of inorganic insulation material having on its outer surface glued straps 314a made, for example of aluminum foil. After the installation of the interior layer section 314 on the pipe (not shown) the exterior layer 318 is dressed around it. An air gap 340 between the interior and outer layers is formed providing an additional thermal insulation.

The elongated mounting cuts 330 are preferably located in different planes.

Before gluing together the interior and exterior layers, the PU layer may be impregnated with organic binder including inorganic particles—as disclosed in our co-pending Israel Patent Application No 120155 (Dated Feb. 5, 1997)—to increase its thermal resistance and to reduce thermal conductivity Those skilled in the art will readily understand that various changes, modifications and variations may be applied to the invention as above exemplified without departing from the scope of the invention as defined in and by the appended claims.

What is claimed is:

1. A method of insulating of a heated substantially planar surface comprising the steps of:

(a) enveloping the surface by a first layer of a heat insulating material having a high thermal resistivity; and (b) enveloping the first layer by a second layer of a material having a lower thermal resistivity, wherein the thickness (L) of the first layer is calculated according to the formula:

$$L=1/b\,ln\,(T_1/t_2)$$

wherein $T_1$ is the temperature of the surface;

$t_2$ is the thermal resistivity of the second layer;

b is an empirical factor, which ranges between 0.019 and 0.025; and ln means the natural (Napierian) logarithm.

2. The method of claim 1 wherein the material of the first layer is of the inorganic type including material or glass wool and the second layer is of foamed polymeric material.

3. The method of insulating of a heated substantially tubular surface comprising the steps of:

(a) enveloping the surface by a first layer of a heat insulating material having a high thermal resistivity; and (b) enveloping the first layer by a second layer of a material having a lower thermal resistivity, wherein the thickness (L') of the first layer is calculated according to the formula:

$$L'/r=(T'_1/t'_2)^{1/f}-1$$

wherein $T'_1$ is the surface temperature of the tubular surface (in ° C.);

$t'_2$ is the thermal resistivity of the second layer;

r is radius of the pipe (in mm); and $f=0.1b(T'_1+0.002\,r\,T'_1+10r)$, wherein, b is an empirical factor which ranges between 0.019 and 0.025.

4. The heated surface insulating covering of claim 3 wherein the material of said first layer is of the inorganic type including mineral or glass wool and the second layer is of foamed polymeric material.

5. The heated surface insulating covering of claim 4 further comprising an air gap between said first and second layers.

6. The heated surface insulating covering of claim 4 wherein the first and second layers each have first and second ends, the first end of the first layer is not covered by the first end of the second layer and wherein the second end of the second layer extends past the second end of the first layer.

7. The heated surface insulating covering of claim 6 wherein said first end of the first layer is coated with an adhesive layer and covered by a protective film.

* * * * *